(12) United States Patent
Lin et al.

(10) Patent No.: US 12,021,367 B2
(45) Date of Patent: Jun. 25, 2024

(54) PROTECTION CIRCUIT AND HUB CHIP

(71) Applicant: VIA LABS, INC., New Taipei (TW)

(72) Inventors: Hsiao Chyi Lin, New Taipei (TW); Chia Ming Tu, New Taipei (TW); Yi Shing Lin, New Taipei (TW); Shao-Yu Chen, New Taipei (TW)

(73) Assignee: VIA LABS, INC., New Taipei (TW)

( * ) Notice: Subject to any disclaimer, the term of this patent is extended or adjusted under 35 U.S.C. 154(b) by 220 days.

(21) Appl. No.: 17/411,289

(22) Filed: Aug. 25, 2021

(65) Prior Publication Data

US 2022/0352704 A1 Nov. 3, 2022

(30) Foreign Application Priority Data

May 3, 2021 (TW) .................................. 110115875

(51) Int. Cl.
*H02H 3/20* (2006.01)
*H02H 1/00* (2006.01)
*H02H 1/04* (2006.01)
*H02H 9/04* (2006.01)

(52) U.S. Cl.
CPC ............ *H02H 1/0061* (2013.01); *H02H 1/04* (2013.01); *H02H 9/04* (2013.01)

(58) Field of Classification Search
CPC .......... H02H 1/0061; H02H 1/04; H02H 9/04; H02M 3/156; H02M 1/088; H02M 1/32
USPC ................................................ 361/93.5, 91.5
See application file for complete search history.

(56) References Cited

U.S. PATENT DOCUMENTS

| | | | |
|---|---|---|---|
| 6,064,231 A * | 5/2000 | Kothandaraman | ........................ H03K 19/00315 326/86 |
| 6,253,329 B1 | 6/2001 | Kang | |
| 6,615,301 B1 | 9/2003 | Lee et al. | |
| 6,809,574 B1 * | 10/2004 | Kiani | ............... H03K 19/00315 327/540 |

(Continued)

FOREIGN PATENT DOCUMENTS

| | | |
|---|---|---|
| CN | 205544514 U | 8/2016 |
| TW | 518856 B | 1/2003 |
| TW | 205544514 U | 8/2016 |

(Continued)

OTHER PUBLICATIONS

Chinese language Notice of Allowance dated Jan. 27, 2022, issued in application No. TW 110115875.

*Primary Examiner* — Jared Fureman
*Assistant Examiner* — Lucy M Thomas
(74) *Attorney, Agent, or Firm* — McClure, Qualey & Rodack, LLP

(57) ABSTRACT

A protection circuit applied in a hub chip including a power pin, a first data pin, and a second data pin is provided. A voltage generation circuit generates and adjusts output voltage according to the voltage of the power pin and the voltage of the first data pin. A PMOS transistor includes a first gate, a first electrode, a second electrode, and a first bulk. The first electrode is coupled to the power pin. The second electrode is coupled to the first data pin. The first bulk receives the output voltage. A detection circuit is coupled to the first gate and detects the voltage of the power pin. In response to the voltage of the power pin being equal to the first voltage, the detection circuit transmits the voltage of the first data pin to the first gate.

10 Claims, 8 Drawing Sheets

(56) References Cited

U.S. PATENT DOCUMENTS 6,970,024 B1* 11/2005 Reese .............. H03K 19/00315
327/112
2010/0073837 A1 3/2010 Predtetchenski et al.

FOREIGN PATENT DOCUMENTS

TW 202109301 A 3/2021
WO 2020100018/125504 A1 7/2018

* cited by examiner

PROTECTION CIRCUIT AND HUB CHIP

CROSS REFERENCE TO RELATED APPLICATIONS

This application claims priority of Taiwan Patent Application No. 110115875, filed on May 3, 2021, the entirety of which is incorporated by reference herein.

BACKGROUND OF THE INVENTION

Field of the Invention

The invention relates to a protection circuit, and more particularly to a protection circuit that prevents mutual interference between the voltages of the pins of a hub chip.

Description of the Related Art

To expand the number of connector ports, a computer device generally uses a hub chip that allows it to be coupled to many external peripheral devices, and it communicates with the peripheral devices via this hub chip. The hub chip includes many transmission interfaces to connect the computer device to the peripheral devices. Generally, each transmission interface includes at least one power pin and at least one data pin. The power pin is configured to transmit power. The power may be provided by a computer device or a power adapter. Generally, the hub chip has a buck circuit to convert the power on the power pin from 5V into 3.3V. Then, the buck circuit transmits the converted voltage (3.3V) to the core circuits of the hub chip. The printed circuit board where the hub chip is located may connect to an external buck circuit to convert 5V into 3.3V. Next, the external buck circuit transmits the converted voltage (3.3V) to the power pin of the hub chip. When the computer device or the power adapter stops providing power (or the computer device directs the hub chip to power down), the voltages of the power pins of each transmission interface of the hub chip should be a low voltage (e.g., 0V) theoretically. At this time, the voltage of the data pins of the external peripheral device (especially external devices with their own power supply, such as external peripheral devices with external power or a battery) connected to the downstream facing port may enter the paths of some circuits in the hub chip to affect the voltages of the power pins of the hub chip. Therefore, the voltages of the power pins may be not the low voltage. The voltage of a power pin may be higher than 2.7V, causing the hub chip to operate abnormally or crash. At this time, when the computer device or the power adapter provides power again, the hub chip cannot operate normally.

BRIEF SUMMARY OF THE INVENTION

In accordance with an embodiment of the disclosure, a protection circuit is applied in a hub chip which includes a transmission interface including a power pin, a first data pin, and a second data pin and includes a voltage generation circuit, a PMOS transistor and a detection circuit. The voltage generation circuit generates and adjusts an output voltage according to the voltage of the power pin and the voltage of the first data pin. The PMOS transistor includes a first gate, a first electrode, a second electrode, and a first bulk. The first electrode is coupled to the power pin. The second electrode is coupled to the first data pin. The first bulk receives the output voltage. The detection circuit is coupled to the first gate and detects the voltage of the power pin. In response to the voltage of the power pin being equal to a first voltage, the detection circuit transmits the voltage of the first data pin to the first gate.

In accordance with another embodiment of the disclosure, a protection circuit is applied in a hub chip including a transmission interface which includes a power pin, a first data pin, and a second data pin, and includes a blocking element and an electrostatic discharge circuit. The blocking element is coupled between the power pin and a first node to block current from entering the power pin from the first node. The electrostatic discharge circuit is coupled between the first node and the first data pin. In response to an electrostatic discharge event occurring at the first data pin, the electrostatic discharge circuit provides a first discharge path to release an electrostatic discharge current from the first data pin, through the first node, to a ground node.

In accordance with another embodiment of the disclosure, a protection circuit is applied in a hub chip including a transmission interface with a power pin and a data pin. The protection circuit includes a voltage generation circuit, a first PMOS transistor, a second PMOS transistor, a blocking element, and an electrostatic discharge circuit. The voltage generation circuit generates and adjusts an output voltage according to the voltage of the power pin and the voltage of the data pin. The first PMOS transistor includes a first gate, a first electrode, a second electrode, and a first bulk. The first electrode is coupled to the power pin. The second electrode is coupled to the data pin. The first bulk receives the output voltage. The second PMOS transistor includes a second gate, a third electrode, a fourth electrode, and a second bulk. The second gate is coupled to the power pin. The third electrode is coupled to the first gate. The fourth electrode is coupled to the data pin. The second bulk is coupled to the first bulk. The blocking element is coupled between the power pin and a node to block current from entering the power pin from the node. The electrostatic discharge circuit is coupled between the node and the data pin.

In accordance with a further embodiment of the disclosure, a hub chip is coupled to a host and includes at least one transmission interface and a control circuit. The transmission interface includes a first data pin and a second data pin. The control circuit is configured to set the voltage of the first data pin and the voltage of the second data pin. In response to the hub chip not receiving any external power: the control circuit sets the voltage of the first data pin to higher than a first set value and sets the voltage of the second data pin to lower than a second set value, the first set value is higher than the second set value, and the external power is provided by the host or a power adapter.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
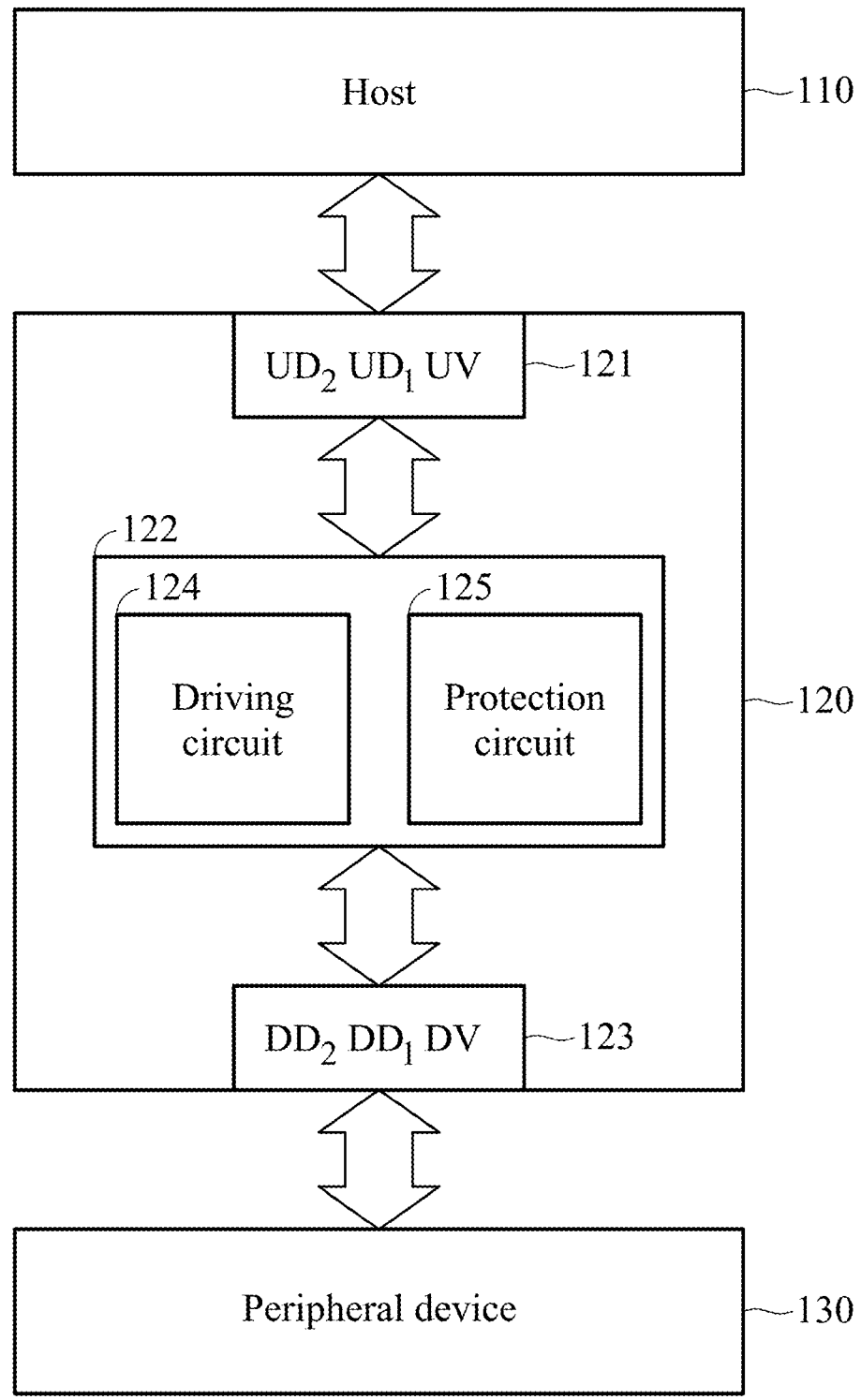
FIG. 1 is a schematic diagram of an exemplary embodiment of an operation system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operation system according to various aspects of the present disclosure. As shown in FIG. 1, the operation system 100 includes a host 110, a hub chip 120, and a peripheral device 130. The host 110 communicates with peripheral device 130 via the hub chip 120. For example, the host 110 provides power and data to the peripheral device 130 via the hub chip 120. The peripheral device 130 operates according to the data provided by the host 110. In another embodiment, the host 110 may only provide data to the peripheral device 130. In this case, the host 110 does not provide power to the peripheral device 130. In other embodiments, the host 110 receives data from the peripheral device 130 via the hub chip 120. In some embodiments, the host 110 further provides power to the hub chip 120.

The hub chip 120 is coupled between the host 110 and the peripheral device 130. The kind of hub chip 120 is not limited in the present disclosure. In one embodiment, the hub chip 120 is a USB hub chip. In this case, when the hub chip 120 transmits data, for example, the hub chip 120 provides data to the host 110 or the peripheral device 130, the hub chip 120 may operate at a full-speed mode. In this embodiment, the hub chip 120 includes transmission interfaces 121, 123, and a control circuit 122. In other embodiments, the hub chip 120 is also coupled to a power adapter (not shown). The hub chip 120 may provide power from the power adapter to the peripheral device 130. In some embodiments, the hub chip 120 may transform (increase or reduce) the power provided by the power adapter and then provide the transformed power to the peripheral device 130. Generally, the hub chip 120 includes a buck circuit (not shown) which converts the power on the power pin from 5V to 3V and then transmits the converted power to the core circuit of the hub chip 120. In another embodiment, an external buck circuit (not shown) is connected to the circuit board in which the hub chip 120 is located to convert the power (e.g., 5V) provided by the power adapter and then transmit the converted power (e.g., 3.3V) to the power pin of the hub chip 120.

The transmission interface 121 is configured to be coupled to the host 110. In this embodiment, the transmission interface 121 has a power pin UV and a data pin $UD_1$.

The power pin UV is configured to receive power from the host 110 or converted power from the host 110. The data pin $UD_1$ is configured to transmit data, such as outputting data to the host 110 or receiving data from the host 110. In other embodiments, the transmission interface 121 further has a data pin $UD_2$. The data pin $UD_2$ is configured to transmit data. In one embodiment, the data pins $UD_1$ and $UD_2$ are configured to transmit differential signals.

The number of power pins and the number of data pins in the transmission interface 121 are not limited in the present disclosure. In other embodiments, the transmission interface 121 may include more power pins or data pins. Additionally, the kind of transmission interface 121 is not limited in the present disclosure. In one embodiment, the transmission interface 121 is a USB connector, such as USB 2.0 connector. In another embodiment, the VBUS pin of USB 2.0 specification may serve as the power pin UV, the D+ pin of USB 2.0 specification may serve as the data pin $UD_1$, and the D− pin of USB 2.0 specification may serve as the data pin $UD_2$. In another embodiment, the VBUS pin of USB 2.0 specification is connected to a buck circuit. In this case, the buck circuit converts the power on the VBUS pin to generate a converted power (e.g., 3.3V) and then provides the converted power to the power pin UV. In some embodiments, since the transmission interface 121 is coupled to the host 110, the transmission interface 121 may be referred to as an upstream facing port (UFP).

The transmission interface 123 is configured to be coupled to the peripheral device 130. In one embodiment, the transmission interface 123 includes a power pin DV and a data pin $DD_1$. When the hub chip 120 is coupled to the peripheral device 130 and the peripheral device 130 is not coupled to a power adapter, the hub chip 120 provides power to the peripheral device 130. The hub chip 120 may output power from the host 110 to the peripheral device 130 via the power pin DV. In other embodiments, the hub chip 120 may convert power (e.g., 5V) provided by a power adapter (not shown) to generate a converted power (e.g., 3.3V) and then provide the converted power to the peripheral device 130 via the power pin DV. When the hub chip 120 is coupled to the peripheral device 130 and the peripheral device 130 is coupled to a power adapter (not shown), the host 110 and the hub chip 120 do not need to provide power to the peripheral device 130. The data pin $DD_1$ is configured to transmit data, such as output data to the peripheral device 130 or receive data from the peripheral device 130. In another embodiment, the transmission interface 123 further includes a data pin $DD_2$. The data pin $DD_2$ is configured to transmit data. In one embodiment, the data pins $DD_1$ and $DD_2$ are configured to transmit differential signals.

The number of power pins and the number of data pins in the transmission interface 123 are not limited in the present disclosure. In other embodiments, the transmission interface 123 may include more power pins or data pins. Additionally, the kind of transmission interface 123 is not limited in the present disclosure. In one embodiment, the transmission interface 123 is a USB connector, such as USB 2.0 connector. In another embodiment, the VBUS pin of USB 2.0 specification may serve as the power pin DV, the D+ pin of USB 2.0 specification may serve as the data pin $DD_1$, and the D− pin of USB 2.0 specification may serve as the data pin $DD_2$. In some embodiments, since the transmission interface 123 is coupled to the peripheral device 130, the transmission interface 123 may be referred to as a downstream facing port (DFP). In other embodiments, the hub chip 120 includes more DFPs to be coupled to more peripheral devices.

The control circuit 122 is coupled between the transmission interfaces 121 and 123 and includes a driving circuit 124. The driving circuit 124 provides power to the power pin DV of the transmission interface 123 according to the power received by the power pin UV of the transmission interface 121. In other embodiments, the driving circuit 124 determines the data provided by the host 110 according to the variations in the voltages of the data pins $UD_1$ and $UD_2$ of the transmission interface 121. The driving circuit 124 controls the variations in the voltages of the data pins $DD_1$ and $DD_2$ of the transmission interface 123 according to the data provided by the host 110. In such cases, the peripheral device 130 operates according to the variations in the voltages of the data pins $DD_1$ and $DD_2$. In another embodiment, the driving circuit 124 determines the data provided by the peripheral device 130 according to the variations in the voltages of the data pins $DD_1$ and $DD_2$ of the transmission interface 123. The driving circuit 124 controls the variations in the voltages of the data pins $UD_1$ and $UD_2$ of the transmission interface 121 according to the data provided by the peripheral device 130. In this case, the host 110 obtains the data provided by the peripheral device 130 according to the variations in the voltages of the data pins $UD_1$ and $UD_2$.

In some embodiments, the control circuit 122 further includes a protection circuit 125. The protection circuit 125 is coupled to the transmission interfaces 121 and 123 to prevent variations in the voltages of the data pins of the transmission interfaces 121 and 123 from interfering with the voltage of the power pin. Taking the transmission interface 123 as an example, when the voltage of the power pin DV is a low voltage (referred to as a first voltage, e.g., 0V), it means that the host 110 (or the power adapter coupled to the hub chip 120) stops providing power. At this time, if the hub chip 120 is coupled to a peripheral device 130 with a power adapter, there are variations in the voltages of the data pins $DD_1$ and $DD_2$ of the transmission interface 123. The voltages of the data pins $DD_1$ and $DD_2$ may pass through the paths of some circuits disposed in the hub chip 120 to the power pin DV of the transmission interface 123 and the power pin UV of the transmission interface 121. It is for this reason that the voltages of the power pin DV of the transmission interface 123 and the power pin UV of the transmission interface 121 are not at the low voltage. In other words, neither the voltage of the power pin DV of the transmission interface 123 nor the voltage of the power pin UV of the transmission interface 121 is not 0V. In some embodiments, when the peripheral device 130 is not coupled to a power adapter and the hub chip 120 does not receive external power (from the host 110 or from a power adapter), there are variations in the voltages of the data pins $DD_1$ and $DD_2$ of the transmission interface 123. For example, the peripheral device 130 may include a battery. In such cases, the peripheral device 130 causes variations in the voltages of the data pins $DD_1$ and $DD_2$ of the transmission interface 123. The voltages of the data pins $DD_1$ and $DD_2$ may pass through the paths of some circuits in the hub chip 120 and affect the voltages of the power pin DV of the transmission interface 123 and the power pin UV of the transmission interface 121. Therefore, the voltages of the power pin DV of the transmission interface 123 and the power pin UV of the transmission interface 121 are not maintained at the low voltage (e.g., 0V), causing the hub chip 120 to operate incorrectly or even to crash. The protection circuit 125 is configured to protect the voltages of the power pins DV and UV to ensure that they are maintained at the low voltage, as a consequence of the variations in the voltages of the data pins $DD_1$ and $DD_2$. Additionally, the driving circuit 124 does not operate incorrectly because the voltage of each of the power pins DV and UV is maintained at the low voltage. Therefore, the hub chip 120 does not crash. When the host 110 or a power adapter (not shown) provides power to the hub chip 120 again, the hub chip 120 can operate immediately.

Figure 2A:
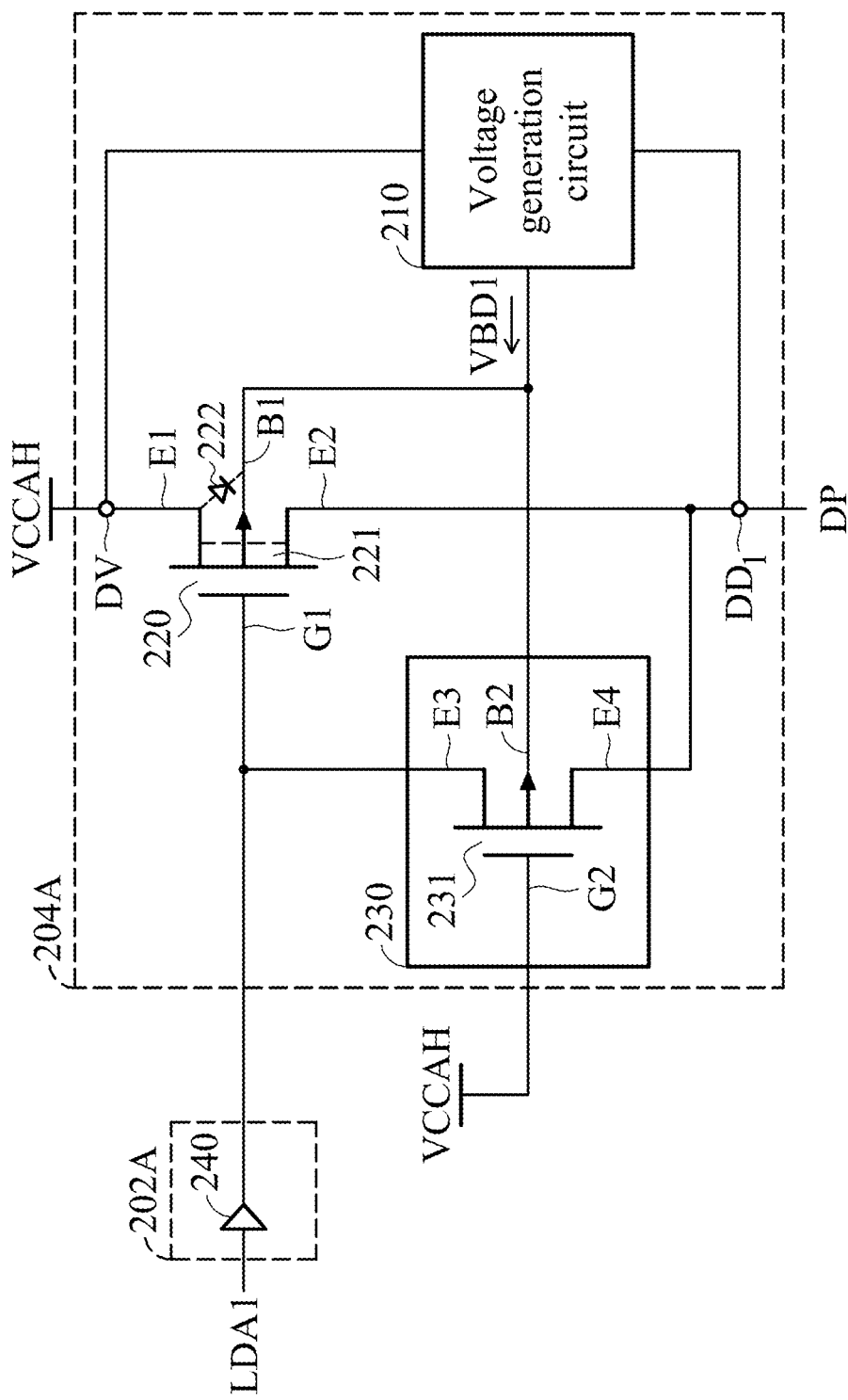
FIG. 2A is a schematic diagram of an exemplary embodiment of a control circuit according to various aspects of the present disclosure.

Since the method used by the protection circuit 125 to protect the power pin UV is the same as the method used by the protection circuit 125 to protect the power pin DV, the transmission interface 123 is given as an example to describe the operation of the protection circuit 125. FIG. 2A is a schematic diagram of an exemplary embodiment of a control circuit according to various aspects of the present disclosure. FIG. 2A only shows the elements related to the present disclosure, but is not used to limit the present disclosure. The control circuit 200A may include other hardware components or software that controls the hardware components, but the descriptions of the hardware components and the software are omitted.

The control circuit 200A includes a driving circuit 202A and a protection circuit 204A. The protection circuit 204A is coupled between the power pin DV and the data pin $DD_1$ to prevent variations in the voltage DP of the data pin $DD_1$ from interfering with the voltage VCCAH of the power pin DV, especially when the hub chip 120 is not receiving any power which may be from the host 110 and a power adapter. In this embodiment, the protection circuit 204A at least includes a voltage generation circuit 210, a PMOS transistor 220, and a detection circuit 230.

The voltage generation circuit 210 generates and adjusts an output voltage VBD1 according to the voltage VCCAH of the power pin DV and the voltage DP of the data pin $DD_1$. In one embodiment, when the voltage VCCAH of the power pin DV is a predetermined voltage (referred to as a second voltage, such as 3.3V), it means that the host 110 or a power adapter provides power to the hub chip 120. Therefore, the voltage generation circuit 210 sets the output voltage VBD1 to equal to the voltage VCCAH of the power pin DV (referred to as a predetermined voltage, such as 3.3V). However, when the voltage VCCAH of the power pin DV is a low voltage (e.g. 0V), it means that the host 110 and the power adapter stop providing power to the hub chip 120. Therefore, the voltage generation circuit 210 may adjust the output voltage VBD1 to ensure that it is lower than the predetermined voltage and the voltage DP of the data pin $DD_1$.

The PMOS transistor 220 includes a gate G1, a bulk B1 and electrodes E1 and E2. When one of the electrodes E1 and E2 serves as a source, the other serves as a drain. In this embodiment, the gate G1 of the PMOS transistor 220 is coupled to the detection circuit 230. The electrode E1 of the PMOS transistor 220 is coupled to the power pin DV. The electrode E2 of the PMOS transistor 220 is coupled to the data pin $DD_1$. The bulk B1 of the PMOS transistor 220 receives the output voltage VBD1. When the voltage VCCAH of the power pin DV is a low voltage (e.g., 0V), since the output voltage VBD1 is less than the voltage DP of the data pin $DD_1$, a body diode 222 between the electrode E1 and the bulk B1 of the PMOS transistor 220 is turned off.

The detection circuit 230 is coupled to the gate G1 and detects the voltage VCCAH of the power pin DV. When the voltage VCCAH of the power pin DV is at a low voltage (e.g., 0V), the detection circuit 230 transmits the voltage DP of the data pin $DD_1$ to the gate G1. At this time, since the voltage of the gate G1 of the PMOS transistor 220 is the same as the voltage of the electrode E2 of the PMOS transistor 220, the PMOS transistor 220 is turned off. Since the channel 221 between the electrodes E1 and E2 is cut off, the PMOS transistor 220 does not transmit the voltage DP of the data pin $DD_1$ to the power pin DV. Therefore, the voltage DP of the data pin $DD_1$ does not interfere with the voltage VCCAH of the power pin DV. In other words, when the voltage VCCAH of the power pin DV is a low voltage (e.g., 0V), the PMOS transistor 220 is turned off and the output voltage VBD1 is less than the voltage DP of the data pin $DD_1$. Therefore, the body diode 222 between the electrode E1 and the bulk B1 of the PMOS transistor 220 is cut off, and no voltage can enter the power pin DV and affect the voltage VCCAH of the power pin DV.

The structure of the detection circuit 230 is not limited in the present disclosure. Any circuit can serve as a detection circuit 230, as long as the circuit is capable of providing the voltage DP of the data pin $DD_1$ to the gate G1 of the PMOS transistor 220 according to the voltage VCCAH of the power pin DV. In this embodiment, the detection circuit 230 includes a PMOS transistor 231. The PMOS transistor 231 includes a gate G2, a bulk B2, and electrode E3 and E4. In such cases, when one of the electrodes E3 and E4 is served as a source, the other is served as a drain. As shown in FIG. 2A, the gate G2 of the PMOS transistor 231 is coupled to the power pin DV to receive the voltage VCCAH. The electrode E3 of the PMOS transistor 231 is coupled to the gate G1. The electrode E4 of the PMOS transistor 231 is coupled to the data pin $DD_1$. The bulk B2 of the PMOS transistor 231 is coupled to the bulk B1 and receives the output voltage VBD1. The above low voltage is a voltage that is capable of turning on a PMOS transistor. Generally, when the gate voltage of the PMOS transistor is less than the sum of the source voltage of the PMOS transistor and a threshold voltage of the PMOS transistor, the PMOS transistor is turned on. Assume that the source voltage of the PMOS transistor is 3.3V, and the threshold voltage of the PMOS transistor is −0.6V. In this case, when the gate voltage of the PMOS transistor is less than 2.7V, the PMOS transistor can be turned on. On the contrary, in one embodiment, the predetermined voltage may be a high voltage, such as a voltage within 2.7V~3.3V.

The driving circuit 202A utilizes the PMOS transistor 220 to control the voltage DP of the data pin $DD_1$. In this embodiment, the driving circuit 202A includes a pre-drive circuit 240. The pre-drive circuit 240 is configured to turn on or off the PMOS transistor 220 according to logic data LDA1 to control the voltage DP of the data pin $DD_1$ when the voltage VCCAH of the power pin DV is a predetermined voltage (e.g., 3.3V). The source providing the logic data LDA is not limited in the present disclosure. In one embodiment, the logic data LDA may be provided by the host 110. In such cases, the driving circuit 202A further includes a decoder circuit (not shown). The decoder circuit generates the logic data LDA according to the variations of the voltages in the data pins $UD_1$ and $UD_2$. In other embodiments, the driving circuit 202A may be integrated into the protection circuit 204A.

Figure 2B:
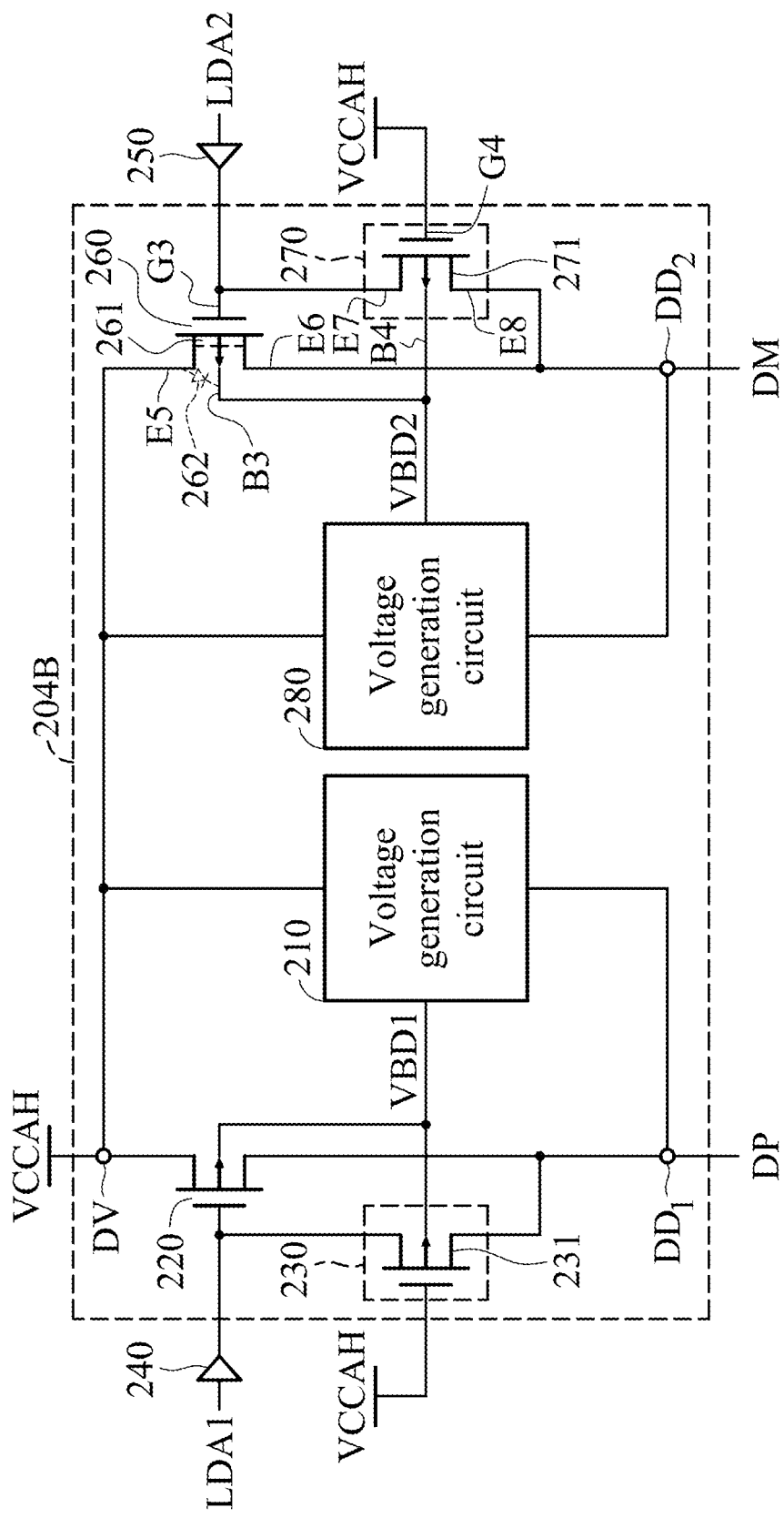
FIG. 2B is a schematic diagram of another exemplary embodiment of the control circuit according to various aspects of the present disclosure.

FIG. 2B is a schematic diagram of another exemplary embodiment of the control circuit according to various aspects of the present disclosure. The control circuit 200B includes a protection circuit 204B and driving circuits 240 and 250. The protection circuit 204B is coupled to the power pin DV and the data pins $DD_1$ and $DD_2$ to prevent variations in the voltage DP of the data pin $DD_1$ and the voltage DM of the data pin $DD_2$ from interfering with the voltage VCCAH of the power pin DV, especially when the hub chip 120 is not receiving power from the host 110 and a power adapter. In this embodiment, the protection circuit 204B includes a voltage generation circuits 210 and 280, PMOS transistors 220 and 260, and detection circuits 230 and 270. Since the features of the voltage generation circuit 210, the PMOS transistor 220 and the detection circuit 230 are described, the related description is omitted here.

The voltage generation circuit 280 generates and adjusts the output voltage VBD2 according to the voltage VCCAH of the power pin DV and the voltage DM of the data pin $DD_2$. For example, when the voltage VCCAH of the power pin DV is a predetermined voltage (3.3V), it means that the host 110 or an external power adapter provides power to the hub chip 120. Therefore, the voltage generation circuit 280 sets the output voltage VBD2 to equal to the voltage VCCAH of the power pin DV. However, when the voltage VCCAH of the power pin DV is a low voltage (e.g., 0V), it means that the host 110 and the external power adapter stop providing power to the hub chip 120. Therefore, the voltage generation circuit 280 adjusts the output voltage VBD2 so that it is lower than the predetermined voltage and the voltage DM of the data pin $DD_2$. In other embodiments, the voltage generation circuits 210 and 280 are integrated into a single voltage generation circuit.

The PMOS transistor 260 includes a gate G3, a bulk B13 and electrodes E5 and E6. When one of the electrodes E5 and E6 is provided as a source, the other of the electrodes E5 and E6 is provided as a drain. In this embodiment, the gate G3 of the PMOS transistor 260 is coupled to the detection circuit 270. The electrode E5 of the PMOS transistor 260 is coupled to the power pin DV. The electrode E6 of the PMOS transistor 260 is coupled to the data pin $DD_2$. The bulk B3 of the PMOS transistor 260 receives the output voltage VBD2. When the voltage VCCAH of the power pin DV is a low voltage (e.g., 0V), since the output voltage VBD2 is lower than the voltage DM of the data pin $DD_2$, a body diode 262 between the electrode E5 and the bulk B3 of the PMOS transistor 260 is turned off.

The detection circuit 270 is coupled to the gate G3 and detects the voltage VCCAH of the power pin DV. When the voltage VCCAH of the power pin DV is a low voltage (e.g., 0V), the detection circuit 270 transmits the voltage DM of the data pin $DD_2$ to the gate G3. At this time, since the voltage of the gate G3 of the PMOS transistor 260 is the same as the voltage of the electrode E6 of the PMOS transistor 260, the PMOS transistor 260 is turned off. Since the channel 261 between the electrodes E5 and E6 is cut off, the PMOS transistor 260 does not transmit the voltage DM of the data pin $DD_2$ to the power pin DV. In other words, when the voltage VCCAH of the power pin DV is the low voltage (e.g., 0V), the PMOS transistor 260 is turned off and the output voltage VBD2 is less than the voltage DM of the data pin $DD_2$. Therefore, the body diode 262 between the electrode E5 and the bulk B3 of the PMOS transistor 260 is turned off, and no voltage can enter the power pin DV and change its voltage VCCAH.

The structure of the detection circuit 270 is not limited in the present disclosure. Any circuit can serve as a detection circuit 270, as long as the circuit is capable of providing the voltage DM of the data pin $DD_2$ to the gate G3 of the PMOS transistor 260 according to the voltage VCCAH of the power pin DV. In this embodiment, the detection circuit 270 includes a PMOS transistor 271.

The PMOS transistor 271 includes a gate G4, a bulk B4, and electrodes E7 and E8. In this case, when one of the electrodes E7 and E8 is served as a source, the other of the electrodes E7 and E8 is served as a drain. As shown in FIG. 2B, the gate G4 of the PMOS transistor 271 is coupled to the power pin DV to receive the voltage VCCAH. The electrode E7 of the detection circuit 270 is coupled to the gate G3. The electrode E8 of the PMOS transistor 271 is coupled to the data pin $DD_2$. The bulk B4 of the PMOS transistor 271 is coupled to the bulk B3 and receives the output voltage VBD2.

In other embodiments, the driving circuit of the control circuit 200B includes pre-drive circuits 240 and 250. Since the feature of the pre-drive circuit 240 is described above, the description of the feature of the pre-drive circuit 240 is omitted. In this case, the pre-drive circuit 250 is configured to turn on or off the PMOS transistor 260 according to logic data LDA2 to control the voltage DM of the data pin DD2 when the voltage VCCAH of the power pin DV is the predetermined voltage.

Figure 3:
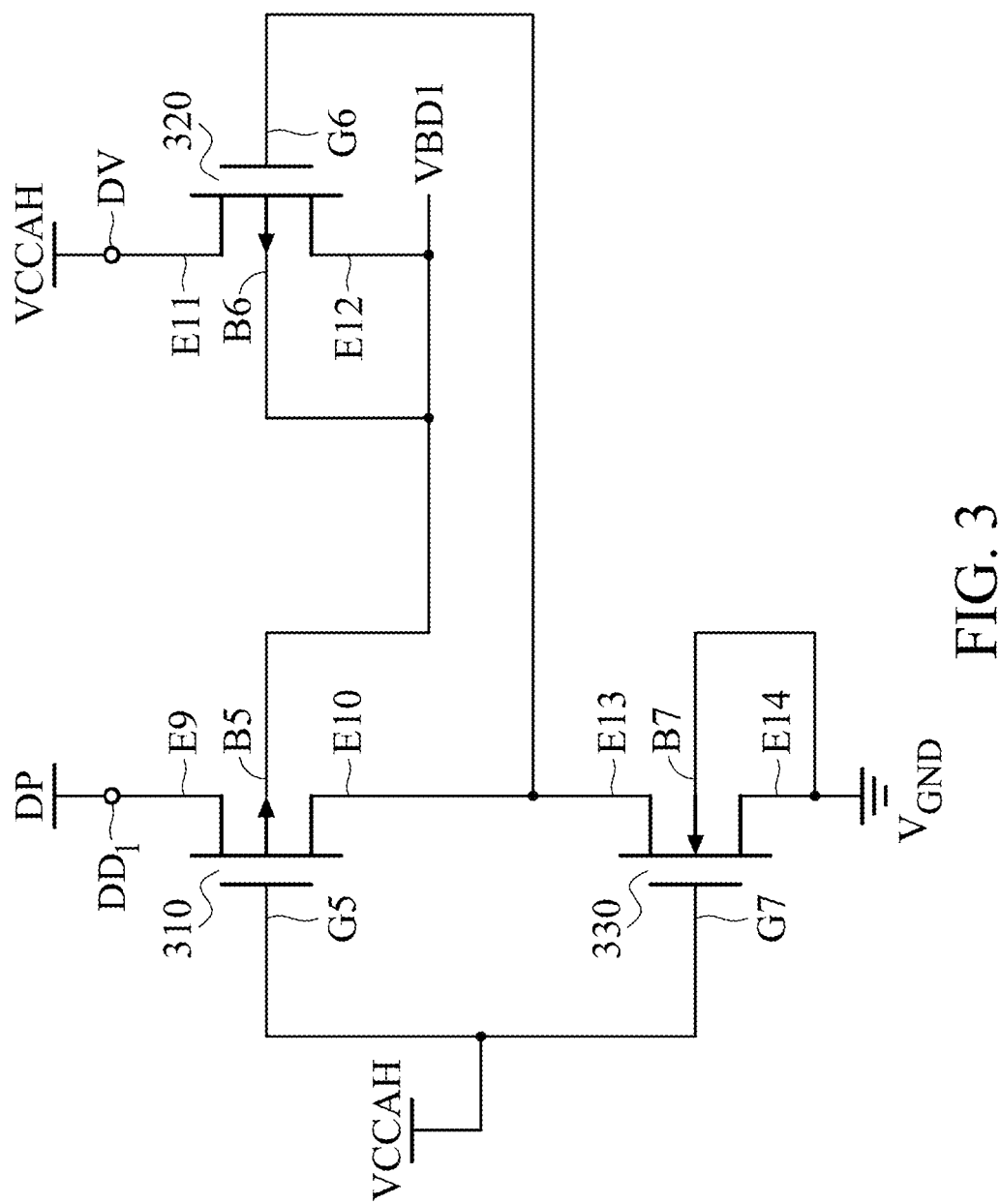
FIG. 3 is a schematic diagram of an exemplary embodiment of a voltage generation circuit according to various aspects of the present disclosure.

FIG. 3 is a schematic diagram of an exemplary embodiment of a voltage generation circuit according to various aspects of the present disclosure. As shown in FIG. 3, the voltage generation circuit 300 includes PMOS transistors 310 and 320, and an NMOS transistor 330. The PMOS transistor 310 includes a gate G5, a bulk B5, and electrodes E9 and E10. When one of the electrodes E9 and E10 is a source, the other of the electrodes E9 and E10 is a drain. The gate G5 of the PMOS transistor 310 is coupled to the power pin DV to receive the voltage VCCAH. The electrode E9 of the PMOS transistor 310 is coupled to the data pin $DD_1$. The bulk B5 of the PMOS transistor 310 is configured to provide the output voltage VBD1.

The PMOS transistor 320 includes a gate G6, a bulk B6, and electrodes E11 and E12. When one of the electrodes E11 and E12 is a source, the other of the electrodes E11 and E12 is a drain. The gate G6 of the PMOS transistor 320 is coupled to the electrode E10. The electrode E11 of the PMOS transistor 320 is coupled to the power pin DV. The electrode E12 of the PMOS transistor 320 is coupled to the bulks B5 and B6 to provide the output voltage VBD1.

The NMOS transistor 330 includes a gate G7, a bulk B7, and electrodes E13 and E14. When one of the electrodes E13 and E14 is a source, the other of the electrodes E13 and E14 is a drain. The gate G7 of the NMOS transistor 330 receives the voltage VCCAH of the power pin DV. The electrode E13 of the NMOS transistor 330 is coupled to the electrode E10. The electrode E14 of the NMOS transistor 330 is coupled to the bulk B7 and a ground terminal to receive a ground voltage $V_{GND}$.

When the voltage VCCAH of the power pin DV is a predetermined voltage (e.g., 3.3V), the PMOS transistor 310 is turned off and the NMOS transistor 330 is turned on. At this time, since the voltage of the gate G6 of the PMOS transistor 320 is equal to the ground voltage $V_{GND}$, The PMOS transistor 320 is turned on. Therefore, the output voltage VBD1 is about equal to the voltage VCCAH (referred to as the predetermined voltage). However, when the voltage VCCAH of the power pin DV is a low voltage (e.g., 0V), the PMOS transistor 310 is turned on to transmit the voltage DP of the data pin $DD_1$ to the gate G6 of the PMOS transistor 320. At this time, the output voltage VBD1 is gradually reduced. When the output voltage VBD1 is approximately equal to the sum of the voltage of the gate G6 of the PMOS transistor 320 and the threshold voltage of the PMOS transistor 320, the PMOS transistor 320 is turned off. Therefore, the output voltage VBD1 is maintained at DP+$V_{TH}$, wherein the $V_{TH}$ is the threshold voltage of the PMOS transistor 320 and is an negative value. The low voltage is a voltage that can turn on a corresponding PMOS transistor. Generally, when the voltage of the gate of the PMOS transistor is smaller than the sum of the voltage of the source of the PMOS transistor and the threshold voltage of the PMOS transistor, the PMOS transistor can be turned on. Assume that the voltage of the source of the PMOS transistor is 3.3V, and the threshold voltage of the PMOS transistor is −0.6V. In such cases, when the voltage of the gate of the PMOS transistor is less than 2.7V, the PMOS transistor is turned on. Conversely, in one embodiment, the predetermined voltage may be a high voltage, such as a voltage that is within 2.7V~3.3V.

The voltage generation circuit 300 shown in FIG. 3 may be applied in the voltage generation circuit 210 in FIGS. 2A and 2B. Furthermore, when the electrode E9 of the PMOS transistor 310 of the voltage generation circuit 300 is coupled to the data pin $DD_2$, the output voltage VBD1 shown in FIG. 3 may be served as the output voltage VBD2 shown in FIG. 2B. At this time, the voltage generation circuit 300 may serve as the voltage generation circuit 280 of FIG. 2B.

Figure 4A:
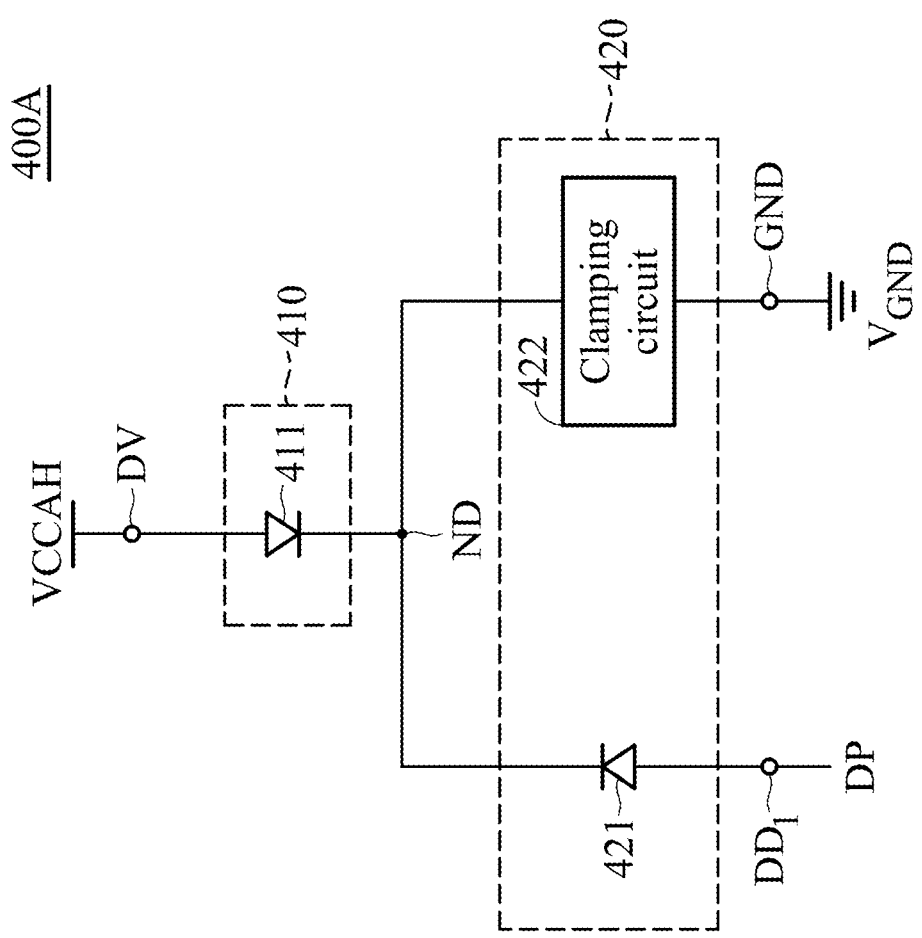
FIG. 4A is a schematic diagram of an exemplary embodiment of a protection circuit according to various aspects of the present disclosure.

FIG. 4A is a schematic diagram of an exemplary embodiment of a protection circuit according to various aspects of the present disclosure. As shown in FIG. 4A, the protection circuit 400A is coupled between the power pin DV and the data pin $DD_1$ to avoid an electrostatic discharge (ESD) current entering the power pin DV from the data pin $DD_1$. In this embodiment, the protection circuit 400A includes a blocking element 410 and a ESD circuit 420.

The blocking element 410 is coupled between the power pin DV and a node ND to avoid the current from the node ND to the power pin DV. In one embodiment, the blocking element 410 is a diode 411. The anode of the diode 411 is coupled to the power pin DV. The cathode of the diode 411 is coupled to the node ND.

The ESD circuit 420 is coupled to the node ND, the data pin $DD_1$, and a ground node GND. When an ESD event occurs in the data pin $DD_1$ and the ground node GND receives a ground voltage $V_{GND}$, the ESD circuit 420 provides a discharge path (not shown) to release an ESD current passing through the node ND from the data pin $DD_1$ to the ground node GND. Since the ESD current is blocked, the ESD current does not enter the hub chip 120 via the power pin DV.

In this embodiment, the ESD circuit 420 includes a diode 421 and a clamping circuit 422. The anode of the diode 421 is coupled to the data pin $DD_1$. The cathode of the diode 421 is coupled to the node ND. The clamping circuit 422 is coupled between the node ND and the ground node GND. When an ESD event occurs, the clamping circuit 422 provides a discharge path for the ESD current to pass from the data pin $DD_1$ to the ground node GND, via the diode 421, the node ND, and the clamping circuit 422. The structure of the clamping circuit 422 is not limited in the present disclosure. Any circuit can serve as a clamping circuit 422, as long as the circuit is capable of detecting an ESD event and providing a discharge path.

Figure 4B:
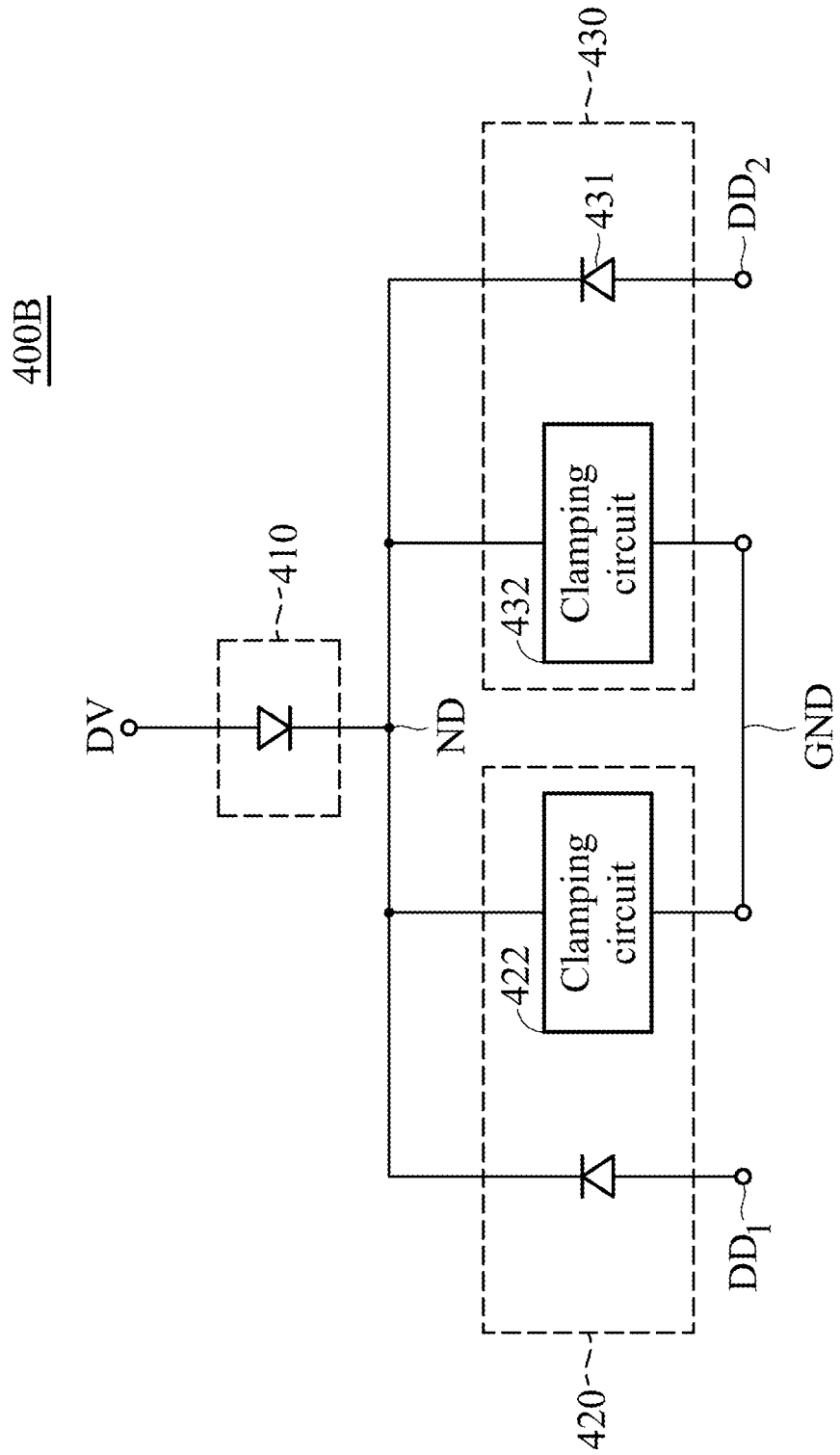
FIG. 4B is a schematic diagram of another exemplary embodiment of the protection circuit according to various aspects of the present disclosure.

FIG. 4B is a schematic diagram of another exemplary embodiment of the protection circuit according to various aspects of the present disclosure. FIG. 4B is similar to FIG. 4A exception that the protection circuit 400B of FIG. 4B further includes an ESD circuit 430. Since the blocking element 410 and the ESD circuit 420 shown in FIG. 4B are described, the description of the blocking element 410 and the ESD circuit 420 are omitted. In this embodiment, the ESD circuit 430 is coupled to the node ND, the data pin $DD_2$, and the ground node GND. When an ESD event occurs in the data pin $DD_2$ and the ground node GND receives a ground voltage $V_{GND}$, the ESD circuit 430 provides a discharge path (not shown) to release an ESD current passing through the node ND from the data pin $DD_2$ to the ground node GND. Since the ESD current does not enter the power pin DV, the ESD current does not enter the hub chip 120. In other embodiments, the ESD circuits 420 and 430 are integrated into a single ESD circuit.

In this embodiment, the ESD circuit 430 includes a diode 431 and a clamping circuit 432. The anode of the diode 431 is coupled to the data pin $DD_2$. The cathode of the diode 431 is coupled to the node ND. The clamping circuit 432 is coupled between the node ND and the ground node GND. When an ESD event occurs, the clamping circuit 432 provides a discharge path so that the ESD current can pass from the data pin $DD_2$ to the ground voltage $V_{GND}$ via the diode 431, the node ND, and the clamping circuit 432. The structure of the clamping circuit 432 is not limited in the present disclosure. Any circuit may serve as a clamping circuit 432, as long as the circuit is capable of detecting an ESD event and providing a discharge path.

Figure 5:
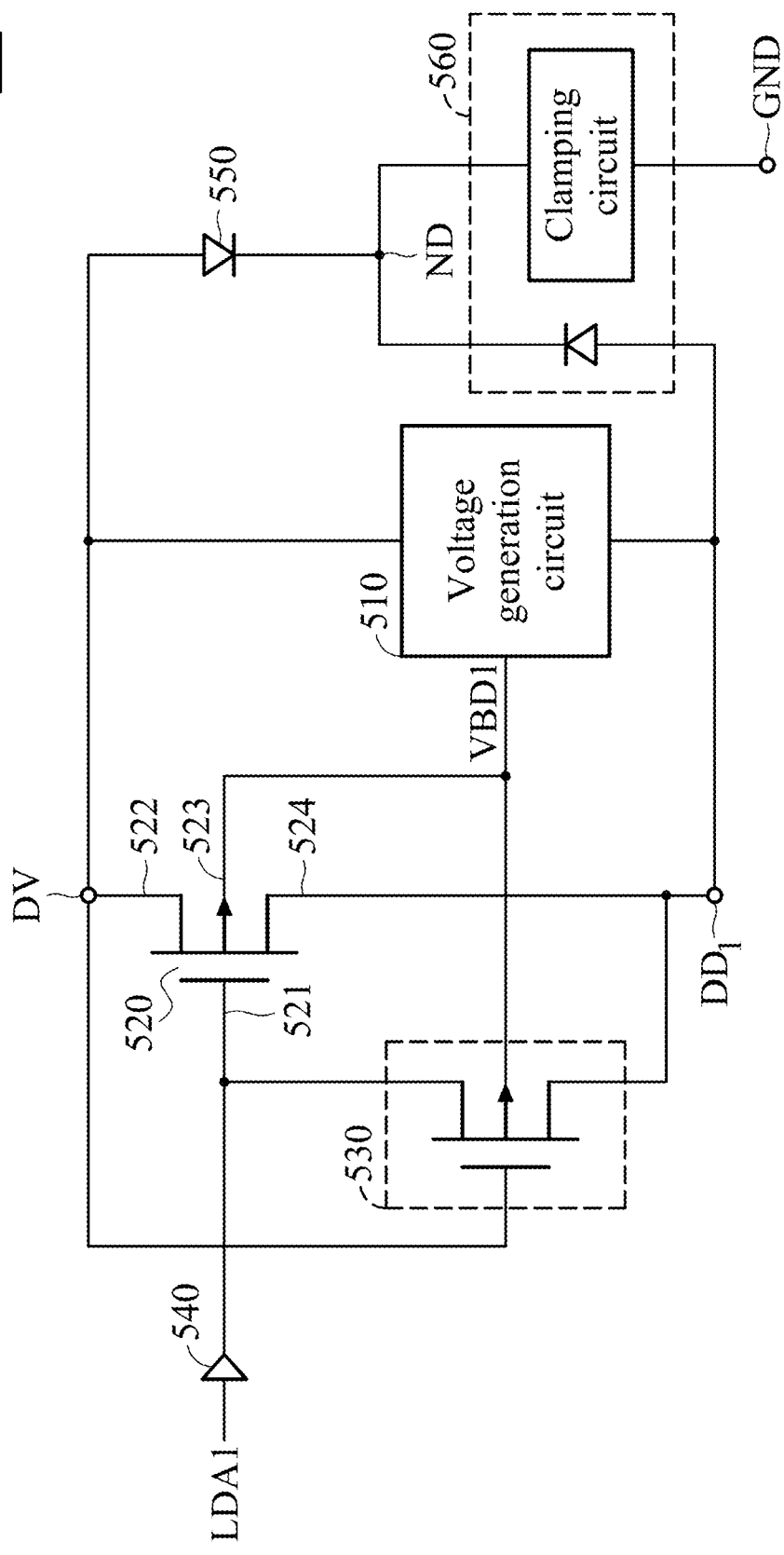
FIG. 5 is a schematic diagram of another exemplary embodiment of the protection circuit according to various aspects of the present disclosure.

FIG. 5 is a schematic diagram of another exemplary embodiment of the protection circuit according to various aspects of the present disclosure. In this embodiment, the protection circuit 500 is a combination of the protection circuit 200A of FIG. 2A and the protection circuit 400A of FIG. 4A. Therefore, the protection circuit 500 not only avoids that the voltage of the power pin DV is interfered with the voltage of the data pin $DD_1$, but also avoids that an ESD current enters the power pin DV.

As shown in FIG. 5, the protection circuit 500 includes a voltage generation circuit 510, a PMOS transistor 520, a detection circuit 530, a pre-drive circuit 540, a blocking element 550, and an ESD circuit 560. The voltage generation circuit 510 generates an output voltage VBD1 and adjusts the output voltage VBD1 according to the voltages of the power pin DV and the data pin $DD_1$. Since the feature of the voltage generation circuit 510 is the same as the features of the voltage generation circuit 210 of FIG. 2A, the description of the feature of the voltage generation circuit 510 is omitted.

The PMOS transistor 520 includes a gate 521, electrodes 522 and 524, and a bulk 523. The gate 521 of the PMOS transistor 520 is coupled to the detection circuit 530. The electrode 522 of the PMOS transistor 520 is coupled to the power pin DV. The electrode 524 of the PMOS transistor 520 is coupled to the data pin $DD_1$. The bulk 523 of the PMOS transistor 520 receives the output voltage VBD1. Since the characteristics of the PMOS transistor 520 is similar to the characteristics of the PMOS transistor 220 shown in FIG. 2A, the related description is omitted here.

The detection circuit 530 transmits the voltage of the data pin $DD_1$ to the gate 521 of the PMOS transistor 520 according to the voltage of the power pin DV. In one embodiment, when the voltage VCCAH of the power pin DV is a low voltage (e.g., 0V), the detection circuit 530 transmits the voltage of the data pin $DD_1$ to the gate 521 of the PMOS transistor 520. Since the features of the detection circuit 530 is the same as the features of the detection circuit 230 of FIG. 2A, the description of the features of the detection circuit 530 is omitted. The pre-drive circuit 540 controls the PMOS transistor 520 according to logic data LDA1 to determine the voltage of the data pin $DD_1$. Since the characteristics of the pre-drive circuit 540 is similar to the characteristics of the pre-drive circuit 240 shown in FIG. 2A, the related description is omitted here.

The blocking element 550 is coupled between the power pin DV and the node ND to block current in the node ND from entering the power pin DV. The ESD circuit 560 is coupled to the node ND, the data pin $DD_1$, and the ground node GND. Since the characteristics of the blocking element 550 and the ESD circuit 560 are similar to the characteristics of the blocking element 410 and the ESD circuit 420 shown in FIG. 4A, the related description is omitted here.

In this embodiment, when the voltage of the power pin DV is a low voltage (e.g., 0V), the detection circuit 530 transmits the voltage of the data pin $DD_1$ to the gate 521 of the PMOS transistor 520. Since the voltage of the gate 521 of the PMOS transistor 520 is the same as the voltage of the electrode 524 and higher than the voltage of the electrode 522, a channel between the electrodes 522 and 524 of the PMOS transistor 520 is not formed. Additionally, since the voltage (VBD1) of the bulk 523 of the PMOS transistor 520 is less than the voltage of the data pin $DD_1$, the body diode between the electrode 522 and the bulk 523 of the PMOS transistor 520 is turned off. In other words, when the voltage VCCAH of the power pin DV is a low voltage (e.g., 0V), the PMOS transistor 520 is turned off and the output voltage VBD1 is less than the voltage DP of the data pin $DD_1$. Since the body diode between the electrode 522 and the bulk 523 of the PMOS transistor 520 is turned off, there is no voltage entering the power pin DV via any path. The low voltage is a voltage that can turn on the corresponding PMOS transistor. Generally, when the voltage of the gate of the PMOS transistor is less than the sum of the voltage of the source of the PMOS transistor and the threshold voltage of the PMOS transistor, the PMOS transistor is turned on. Assume that the voltage of the source of the PMOS transistor is 3.3V, and the threshold voltage of the PMOS transistor is −0.6V. In such cases, when the voltage of the gate of the PMOS transistor is less than 2.7V, the PMOS transistor is turned on. In other embodiments, the predetermined voltage may be a high voltage, such as a voltage within 2.7V~3.3V.

In other embodiments, when an ESD event occurs in the data pin $DD_1$, the voltage of the node ND is gradually increased. The blocking element 550 prevents the voltage of the node ND from interfering with the voltage of the power pin DV. When the voltage of the node ND reaches a trigger value, the ESD circuit 560 is triggered to provide a discharge path. Therefore, an ESD current is released from the data pin $DD_1$, through the node ND and the discharge path of the ESD circuit 560, to the ground node GND.

Since the voltage of the data pin $DD_1$ does not interfere with the voltage of the power pin DV, the operation of the hub chip 120 is not affected by the voltage of the power pin DV and the operation of the hub chip 120 is correct. Therefore, the hub chip 120 operates normally when the host 110 or the external power adapter provides power again.

Figure 6:
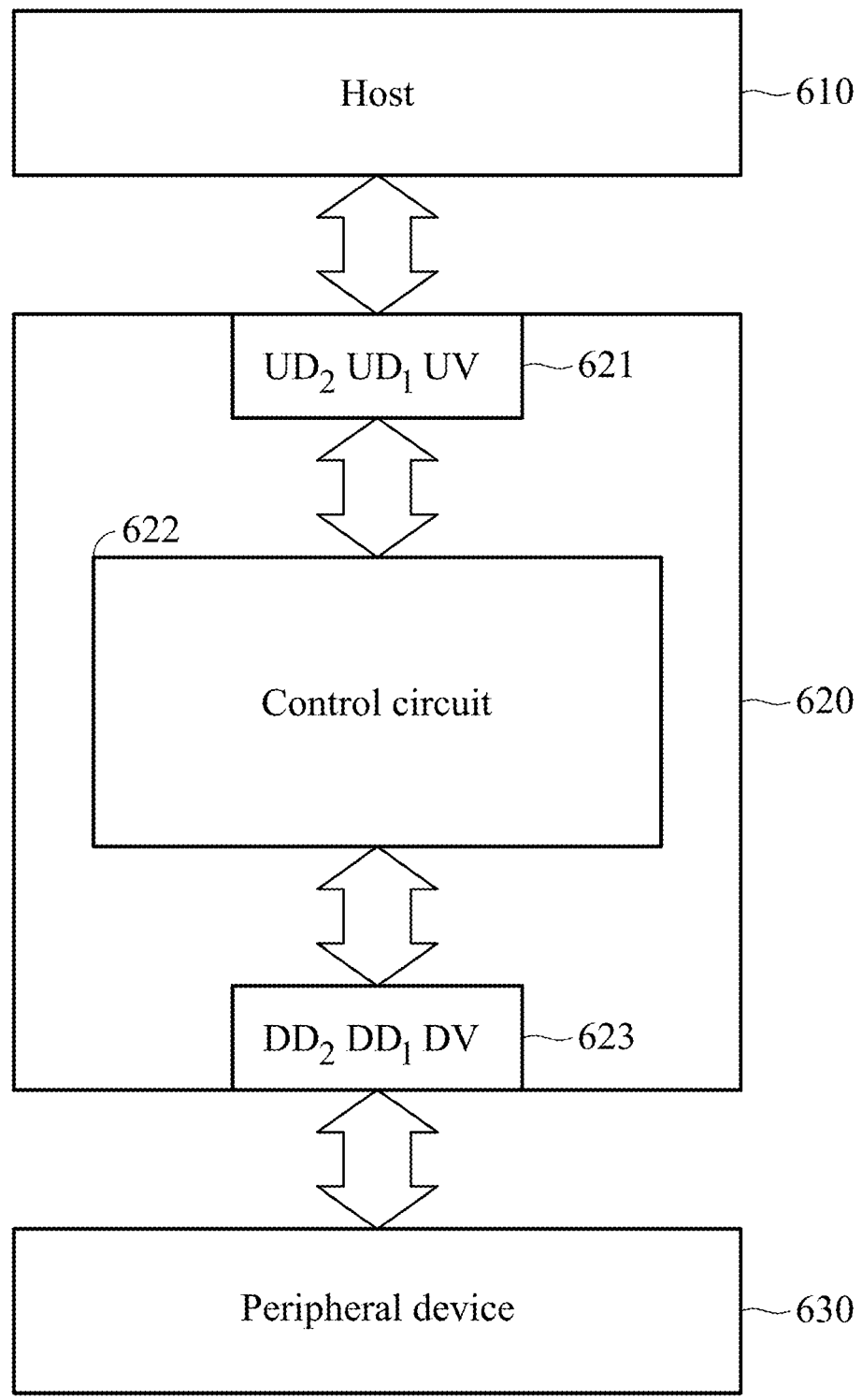
FIG. 6 is a schematic diagram of another exemplary embodiment of the operation system according to various aspects of the present disclosure.

FIG. 6 is a schematic diagram of another exemplary embodiment of the operation system according to various aspects of the present disclosure. As shown in FIG. 6, the operation system 600 includes a host 610, a hub chip 620, and a peripheral device 630. The host 610 communicates with the peripheral device 630 via the hub chip 620. Since the characteristics of the host 610 and the peripheral device 630 are similar to the characteristics of the host 110 and the peripheral device 130 shown in FIG. 1, the related description is omitted here.

The hub chip 620 is coupled between the host 610 and the peripheral device 630. The kind of hub chip 620 is not limited in the present application. In one embodiment, the hub chip 620 is a USB hub chip. The hub chip 620 may receive power from the host 610 or a power adapter (not shown). In some embodiments, the hub chip 620 provides power to the peripheral device 630 according to the power provided by the host 610 or the power adapter.

In this embodiment, the hub chip 620 includes transmission interfaces 621 and 623, and a control circuit 622. Since the characteristics of the transmission interfaces 621 and 623 are similar to the characteristics of the transmission interfaces 121 and 123 shown in FIG. 1, the related description is omitted here. When the hub chip 620 does not receive external power, which may be provided by the host or a power adapter, the control circuit 622 protects the power pins of the transmission interfaces 621 and 623 to prevent their voltages from experiencing interference from the voltage of the data pins of the transmission interfaces 621 and 623. In some embodiments, when the host 610 enters a power down mode, it stops providing power to the hub chip 620. At this time, the host 610 is still connected to the hub chip 620, and the voltage of the power pin DV is a low voltage. Therefore, the control circuit 622 determines whether the host 610 provides power according to the voltage of the power pin DV.

In other embodiments, the hub chip 620 includes a power socket (not shown). The power socket is configured to receive power from an external power adapter. When the external power adapter inserts the power socket, the control circuit 622 operates according to the power provided by the external power adapter. In this case, the control circuit 622 determines whether the external power adapter provides the power according to the voltage of the power socket.

In one embodiment, when the host 610 stops providing power, and when the power adapter also does not provide power to the hub chip 620, the control circuit 622 sets the voltages of the data pins of the transmission interfaces 621 and 623. Taking the transmission interface 623 as an example, the control circuit 622 may set the voltage of one of the data pins $DD_1$ and $DD_2$ to higher than a first set value and set the voltage of the other of the data pins $DD_1$ and $DD_2$ to lower than a second set value. In such cases, the first set value is higher than the second set value. For example, the first set value may be 2V, and the second set value may be 0.8V.

The structure of control circuit 622 is not limited in the present disclosure. In one embodiment, the feature of the control circuit 622 is similar to the control circuit 200A shown in FIG. 2A or the control circuit 200B shown in FIG. 2B. In other embodiments, the control circuit 622 includes the protection circuit 400A shown in FIG. 4A, the protection circuit 400B shown in FIG. 4B, or the protection circuit 500 shown in FIG. 5.

In other embodiments, it can be obtained whether the hub chip 620 includes a protection mechanism according to the variations in the voltages of the data pins of the transmission interface of the hub chip 620. Assume that the host 610 is connected to the hub chip 620 and the peripheral device 630. When the hub chip 620 does not receive external power from the host 610 or a power adapter, if the voltage of one of a first data pin and a second data pin of each transmission interface of the hub chip 620 is larger than or equal to 2V and the voltage of the other of a first data pin and a second data pin of each transmission interface of the hub chip 620 is less than 0.8V, it means that the hub chip 620 includes a protection circuit which is configured to prevent the voltages of the data pins of the transmission interface from affecting the voltage of the power pin of the transmission interface. In some embodiments, the first data pin is the D+ pin of the USB 2.0 specification, and the second data pin is the D− pin of the USB 2.0 specification.

On the contrary, when the hub chip does not receive external power, if the voltages of the first and second data pins of each transmission interface are higher than 0.8V, it means that the hub chip does not include a protection circuit. At this time, since voltages of the first and second data pins of each transmission interface are higher than 0.8V, it is the illegal state defined in the USB 2.0 specification. Therefore, the hub chip may operate incorrectly or to crash. When the host is woken up or the power adapter provides the power again, the hub chip cannot operate normally.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A protection circuit applied in a hub chip which comprises a transmission interface comprising a power pin, a first data pin, and a second data pin, comprising:
    a voltage generation circuit generating and adjusting a first output voltage according to a voltage of the power pin and a voltage of the first data pin;
    a first PMOS transistor comprising a first gate, a first electrode, a second electrode, and a first bulk, wherein the first electrode is directly connected to the power pin, the second electrode is coupled to the first data pin, and the first bulk receives the first output voltage; and
    a first detection circuit coupled to the first gate and detecting the voltage of the power pin,
    wherein:
    the voltage generation circuit is directly connected to the first electrode,
    in response to the voltage of the power pin being equal to a first voltage;
    the first detection circuit transmits the voltage of the first data pin to the first gate, and
    the first output voltage is lower than the voltage of the first data pin.

2. The protection circuit as claimed in claim 1, wherein in response to the voltage of the power pin being equal to the first voltage, a channel between the first electrode and the second electrode is cut off and a body-diode between the first electrode and the first bulk is turned off.

3. The protection circuit as claimed in claim 2, wherein the first detection circuit comprises:
    a second PMOS transistor comprising a second gate, a third electrode, a fourth electrode, and a second bulk, wherein the second gate is coupled to the power pin, the third electrode is coupled to the first gate, the fourth electrode is coupled to the first data pin, and the second bulk is coupled to the first bulk.

4. The protection circuit as claimed in claim 2, further comprising:
a third PMOS transistor comprising a third gate, a fifth electrode, a sixth electrode, and a third bulk, wherein the fifth electrode is coupled to the power pin, the sixth electrode is coupled to the second data pin, and the third bulk receives a second output voltage; and
a second detection circuit coupled to the third gate and detecting the voltage of the power pin,
wherein:
in response to the voltage of the power pin being equal to the first voltage, the second detection circuit transmits a voltage of the second data pin to the third gate, and
the voltage generation circuit generates and adjusts the second output voltage according to the voltages of the power pin and the second data pin.

5. The protection circuit as claimed in claim 4, wherein in response to the voltage of the power pin being equal to the first voltage, a channel between the fifth electrode and the sixth electrode is cut off and a body-diode between the fifth electrode and the third bulk is turned off.

6. The protection circuit as claimed in claim 5, wherein the second detection circuit comprises:
a fourth PMOS transistor comprising a fourth gate, a seventh electrode, an eighth electrode, and a fourth bulk, wherein the fourth gate is coupled to the power pin, the seventh electrode is coupled to the third gate, the eighth electrode is coupled to the second data pin, and the fourth bulk is coupled to the third bulk.

7. The protection circuit as claimed in claim 3, wherein the voltage generation circuit comprises:
a fifth PMOS transistor comprising a fifth gate, a ninth electrode, a tenth electrode, and a fifth bulk, wherein the fifth gate is coupled to the power pin, and the ninth electrode is coupled to the first data pin;

a sixth PMOS transistor comprising a sixth gate, an eleventh electrode, a twelfth electrode, and a sixth bulk, wherein the sixth gate is coupled to the tenth electrode, the eleventh electrode is coupled to the power pin, and the twelfth electrode is coupled to the fifth and sixth bulks to provide the first output voltage; and
an NMOS transistor comprising a seventh gate, a thirteenth electrode, a fourteenth electrode, and a seventh bulk, wherein the seventh gate is coupled to the power pin, the thirteenth electrode is coupled to the tenth electrode, and the fourteenth electrode is coupled to the seventh bulk and a ground terminal.

8. The protection circuit as claimed in claim 7, wherein in response to the voltage of the power pin being equal to the first voltage:
the fifth PMOS transistor is turned on,
the sixth PMOS transistor is turned off, and
the first output voltage is equal to the sum of a voltage of the sixth gate and a threshold voltage of the sixth PMOS transistor.

9. The protection circuit as claimed in claim 8, wherein in response to the voltage of the power pin being equal to a second voltage:
the fifth PMOS transistor is turned off,
the sixth PMOS transistor and the NMOS are turned on, and
the first output voltage is the second voltage.

10. The protection circuit as claimed in claim 1, further comprising:
a driving circuit controlling the first PMOS to adjust the voltage of the first data pin according to logic data in response to the voltage of the power pin being equal to a second voltage,
wherein the second voltage is higher than the first voltage.

* * * * *